United States Patent
Rossi et al.

(10) Patent No.: US 9,421,705 B2
(45) Date of Patent: Aug. 23, 2016

(54) VALVE PIN BUSHING FOR THE HOT RUNNER OF AN INJECTION MOLD

(71) Applicant: INGLASS S.P.A., S. Polo di Piave (TV) (IT)

(72) Inventors: Massimo Rossi, S. Polo di Piave (IT); Andrea Varaschin, S. Polo di Piave (IT); Andrea Zanette, S. Polo di Piave (IT)

(73) Assignee: INGLASS S.P.A., S. Polo di Piave (TV) (IT)

( * ) Notice: Subject to any disclaimer, the term of this patent is extended or adjusted under 35 U.S.C. 154(b) by 289 days.

(21) Appl. No.: 14/054,528

(22) Filed: Oct. 15, 2013

(65) Prior Publication Data

US 2014/0103578 A1   Apr. 17, 2014

(30) Foreign Application Priority Data

Oct. 16, 2012   (IT) ................ TV2012A0198

(51) Int. Cl.
*B29C 45/18* (2006.01)
*B29C 45/28* (2006.01)

(52) U.S. Cl.
CPC .......... *B29C 45/18* (2013.01); *B29C 45/2806* (2013.01); *B29C 2045/2889* (2013.01)

(58) Field of Classification Search
CPC ............... B29C 45/18; B29C 45/2806; B29C 2045/2889; B29C 45/20; B29C 2045/2855; B29C 45/28; B29C 2045/2733
See application file for complete search history.

(56) References Cited

U.S. PATENT DOCUMENTS

| 4,932,858 | A  | * | 6/1990 | Gellert | ........................... 425/564 |
|-----------|----|---|--------|---------|------------------------------------|
| 5,795,600 | A  | * | 8/1998 | Rozema  | .............. B29C 45/2806 264/328.9 |
| 6,679,697 | B2 | * | 1/2004 | Bouti   | ............................ 425/130 |
| 7,581,944 | B2 | * | 9/2009 | Fairy   | ................... B29C 45/2806 425/564 |
| 2003/0118687 | A1 | * | 6/2003 | Dewar  | ................ B29C 45/2806 425/564 |
| 2004/0164459 | A1 | * | 8/2004 | Babin et al. | ............... 264/328.15 |

FOREIGN PATENT DOCUMENTS

| CA | EP 0264725 | A2 | * | 4/1988 | ......... B29C 45/2806 |
| CA | EP 0405007 | A2 | * | 1/1991 | ......... B29C 45/2806 |

* cited by examiner

*Primary Examiner* — Alison L Hindenlang
*Assistant Examiner* — Jerzi H Moreno Hernandez
(74) *Attorney, Agent, or Firm* — Birch, Stewart, Kolasch & Birch, LLP

(57) ABSTRACT

To improve the flow symmetry and the molding quality, it is presented a valve pin bushing for the hot runner of an injection mold, including two input channels, each having a geometric axis and through which the material to be injected can enter through an outlet into, and an output channel, which extends along a longitudinal axis up to an output from which the material can exit the valve pin bushing. The portions of the geometric axes, which extend at the outlet are arranged so that on any imaginary plane passing through the longitudinal axis there lies at most one portion.

15 Claims, 4 Drawing Sheets

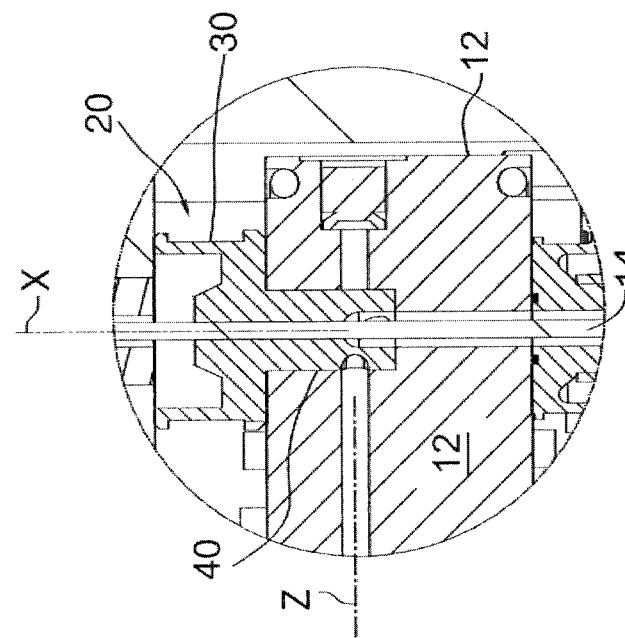
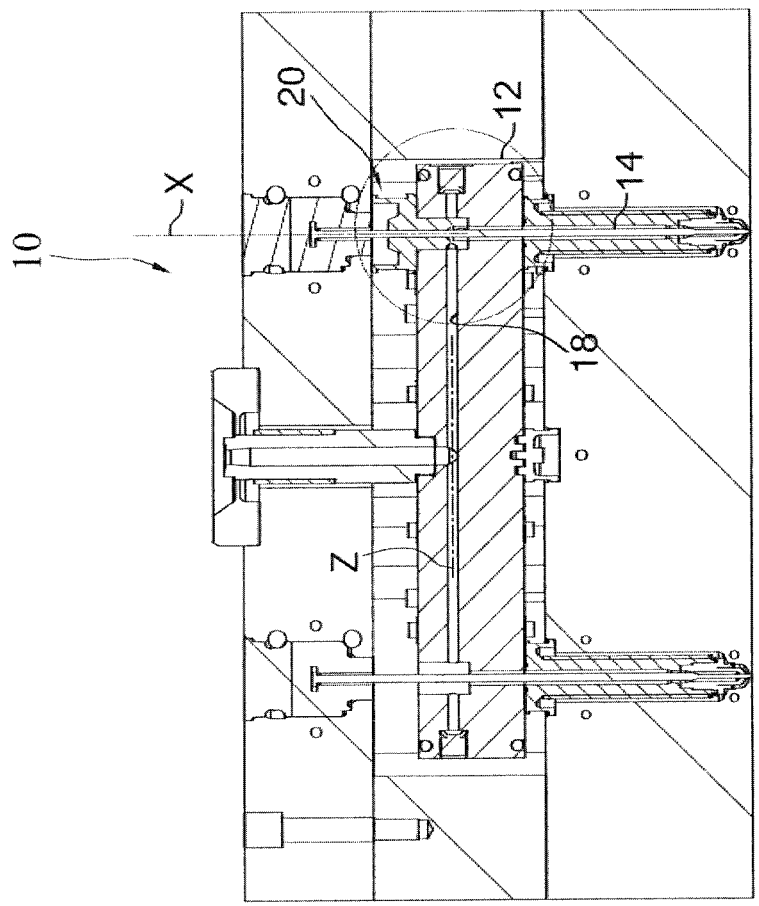
Fig. 2
Fig. 1

VALVE PIN BUSHING FOR THE HOT RUNNER OF AN INJECTION MOLD

CROSS-REFERENCE TO RELATED APPLICATIONS

This application claims priority under 35 U.S.C. §1.19(a) to Application No. TV 2012 A 000198, filed in Italy on Oct. 16, 2012, the entirety of which is incorporated herein by reference.

BACKGROUND OF THE INVENTION

1. Field of the Invention

The invention relates to a valve pin bushing for the hot runner of an injection mold.

2. Description of Background Art

In injection molds the molding material usually comes from a feeder (manifold) and, changing direction by 90 degrees, flows into the channel of a valve pin bushing which coaxially contains a shutter pin controlled by an external actuator. The shutter pin by translating can open or close an orifice, commonly called "gate", located at the end of a heated nozzle communicating with the valve pin bushing and from where the material passes in the mold cavity.

Generally the entry of the valve pin bushing is coaxial to the duct in the manifold and with axis orthogonal to that of the channel in which the shutter pin slides. With this geometry the incoming plastic material is forced to deviate by 90 degrees and bump against the shutter pin, thereby generating two zones with different flow velocity: high, in front of the entry, and low or zero in the opposite part behind the shutter pin. Resulting material feeding fronts are oval or elongated, which cause asymmetries in the fillings.

To uniform the velocity inside the nozzles, valve pin bushes have been developed with particular geometries. In EP0264725 the valve pin bushing has two channels that convey the flow coming from the manifold to diametrically opposite sides of the shutter pin. For difficulty of construction the valve pin bushing is divided into two parts, complicating the assembly and construction thereof. The next variant in EP0405007 consists of a single piece, but tests and simulations in fluid dynamics show that in homogeneity of the flow within the nozzle and during the filling of the cavity persists anyway.

SUMMARY OF THE INVENTION

There is the intention therefore to obviate one or more of these problems with a valve pin bushing and/or method as in the appended claims, in which the dependent ones define advantageous variants.

The inventive concept provides a valve pin bushing for the hot runner of a injection mold, comprising:

two input channels, each having a geometric axis and through which material to be injected can enter through an outlet into an output channel which extends along a longitudinal axis up to an exit from which the material can exit the valve pin bushing, characterized in that the portions of the geometric axes which extend at the outlet are arranged so that on any imaginary plane passing through said longitudinal axis there lies at most one portion.

For geometric axis of a channel or duct we mean the locus of the barycentres relative to the section of the duct or channel.

The said valve pin bushing improves the solution in EP0405007 because it is a single piece, it is of easy construction, and especially the flow of material that arrives from the manifold, thanks to the relative geometry and/or spatial disposition of the channels, allows to balance the differences in velocity inside the valve pin bushing. Said geometrical axes do not lie as in the prior art on a same imaginary plane passing through said longitudinal axis but are external to it, i.e. they are not contained in such plane and/or they intersect it at one point at most. Asymmetries in the flow are thus corrected and a circumferential symmetry of the velocity field in the material and, consequently, the filling of the molding cavity, is re-established. Fluid dynamics simulations and laboratory tests show that the symmetry of filling for the molding cavity (downstream the valve pin bushing) increases, and therefore the quality of the molded piece improves.

Preferably the channels are two, both because it is the minimum number to balance the flow while maintaining the symmetry of the channels, and because experimentally the results are the best. With three or more channels, at least one of them would have greater or lesser distance from the others, and therefore there would be a slight prevalence of the flow, but still this keeps an improvement over the known art.

Preferably for both the input channels said portions of the geometric axes are arranged so as to belong to the same semispace delimited by an imaginary plane passing through said longitudinal axis. Even though each of said portions of the geometric axes could belong to different semispaces as well, this way the characteristics of the flow can be improved.

As other preferred geometric variations to improve the flow course in the various applications:

said portion of said geometric axes, for one or both, is inclined with respect to a second imaginary plane orthogonal to the imaginary plane defined above; and/or said portions of the geometric axes are parallel to each other and/or to the above-defined imaginary plane passing through the longitudinal axis;

said portions are inclined with respect to said imaginary plane defining in the space the two semispaces and with respect to which plane said portions are located in the same semispace.

In the valve pin bushing one or each of the input channels can be joined up to a groove which extends on the outer surface of said part. The advantage is to provide a mutual fitting being simple to implement and simple to program for processing on chip-removal machines. In fact, a channel can all be derived on the valve pin bushing and thus on the manifold (hot runner) being sufficient a seat, e.g. cylindrical, with well-defined size and tolerance.

In the valve pin bushing, with the above-mentioned advantages, each input channel can be joined up to a groove as defined above, and the two grooves can converge towards a common zone to form a material-receiving zone.

Generally, to improve the adaptation between the valve pin bushing and the manifold, the transit section of each groove can be smaller than the section of the supply channel that conveys the material from the manifold (and therefore smaller than the material-receiving zone's section). Or the receiving zone can, i.e. have size and shape adapted to, geometrically fit together with the channel of the manifold.

A method is advantageous for conveying molten molding material into a valve pin bushing belonging to a hot runner of a mold, the valve pin bushing comprising an output channel which extends along a longitudinal axis up to an exit from which the material can exit the valve pin bushing, characterized by feeding the material into the output channel through two input channels, which have a geometric axis and an outlet into the output channel, and arranging the portions of the geometric axes extending at the outlet so that on any imaginary plane passing through said longitudinal axis there lies at most one of said portions.

The use or application of the technical features defined and described for the valve pin bushing are advantageously also method steps for the method, which for sake of brevity are not repeated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a vertical cross-section of a hot runner;

FIG. 2 shows an enlargement of the dotted circle in FIG. 1;

DETAILED DESCRIPTION OF THE PREFERRED EMBODIMENTS

Figure 9:
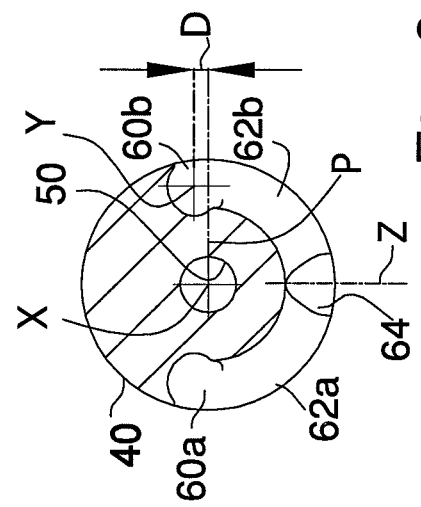
FIG. 9 shows a sectional view along the plane IX-IX of FIG. 5.

In the figures the same reference numerals indicate same parts.

FIG. 1 shows a half mold 10 in which there is installed a hot runner that houses a valve pin bushing 20 coupled in known manner to a manifold 12 and built to drive a shutter pin 14 movable along a longitudinal axis X. The shutter 14 adjusts in known manner the flow of molten material coming out from a heated nozzle 16, while a conduit 18 (with Z axis) internal to the manifold 12 can feed molten material to the valve pin bushing 20.

Figure 3:
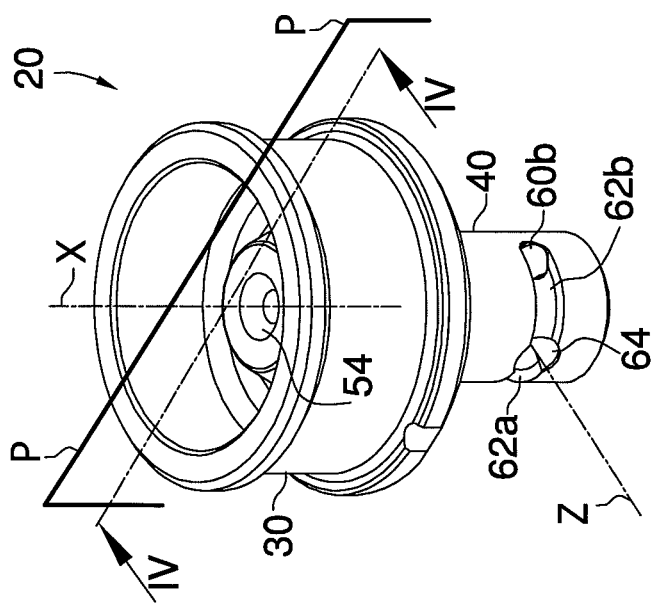
FIG. 3 shows an isometric view of a valve pin bushing.
Figure 4:
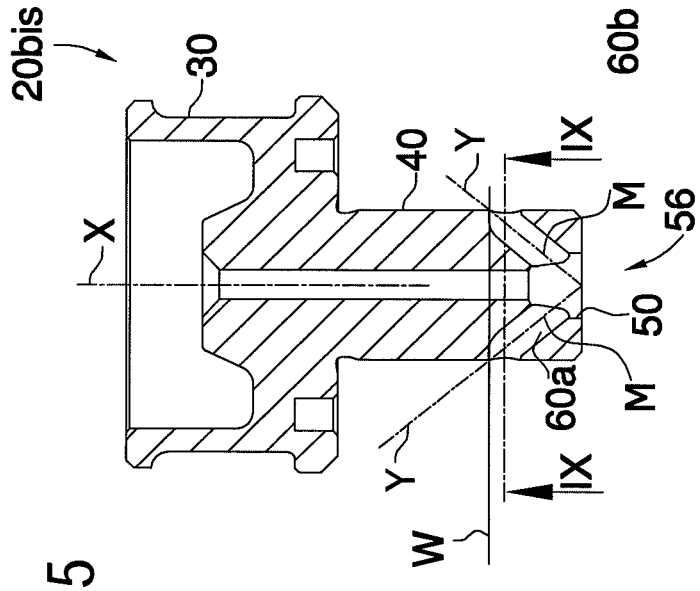
FIG. 4 shows a sectional view along the plane IV-IV of FIG. 3.

With reference to FIGS. 3 and 4, it is noted that the valve pin bushing 20 comprises an annular body 30 from which coaxially extends a substantially cylindrical part 40. The body 30 has a central channel 54, in which the shutter 14 slides, which communicates with a coaxial channel 50 of slightly larger diameter obtained in the part 40. The channel 50 communicates with two input channels 60a, 60b through which the material to be injected can enter into the part 40 and then get out of it, running along the channel 50, from an outlet 56.

The channels 60a, b are made as holes in the part 40 and join up respectively to a superficial groove 62a, 62b formed in the volume of the part 40. The two grooves 62a, 62b both extend on the surface of the part 40 for a quarter of a turn (FIG. 9), meeting to form an entrance 64 which is coupled with the conduit 18.

Figure 5:
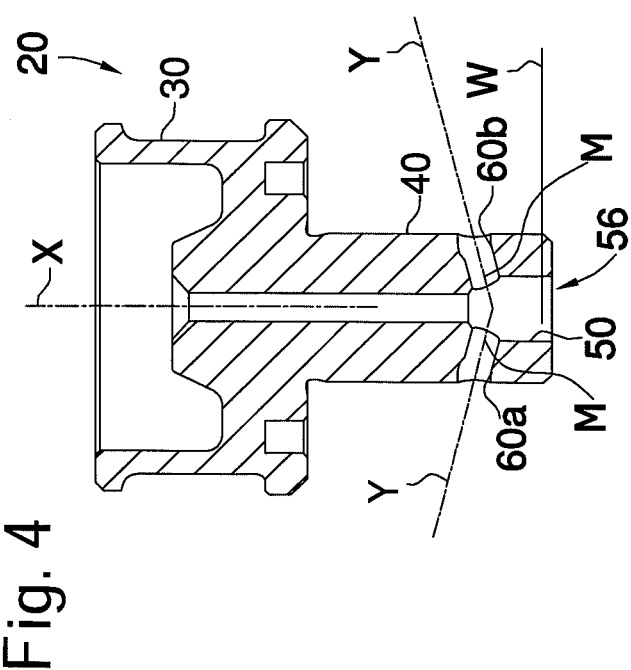
FIG. 5 shows a vertical sectional view of a variant of the valve pin bushing.

The inputs 60a, b have the geometric axes Y which preferably can have some inclination with respect to an imaginary plane W orthogonal to the axis X. In particular in FIG. 4 the inclination angle is 15 degrees, whereas in a variant of valve pin bushing 20b is, represented in FIG. 5, is 60 degrees. These arrangements allow easy implementation of the channels with a tool machine, with the machining starting from the outside of the part 40 in the case of FIG. 4 and from the inside of the channel 50 in the case of FIG. 5.

Figure 8:
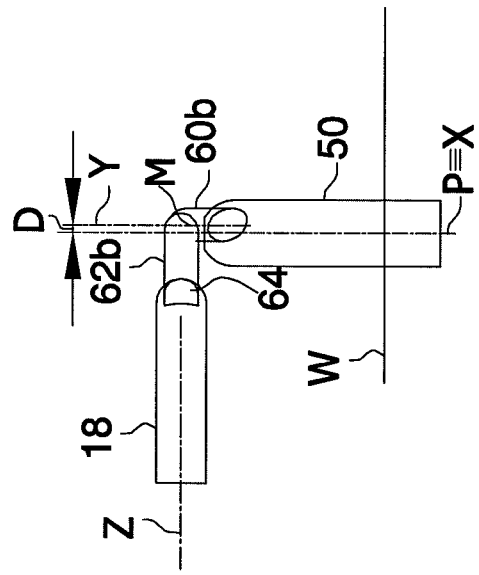
FIG. 8 shows the three-dimensional reconstruction of FIG. 6 in side view.
Figure 7:
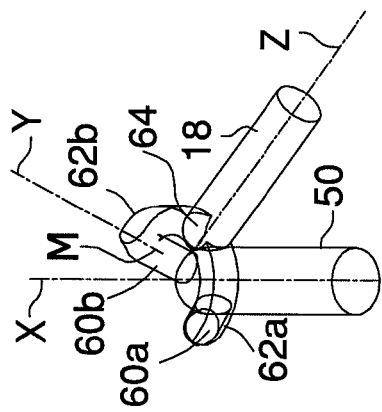
FIG. 7 shows the three-dimensional reconstruction of FIG. 6 as a perspective view.
Figure 6:
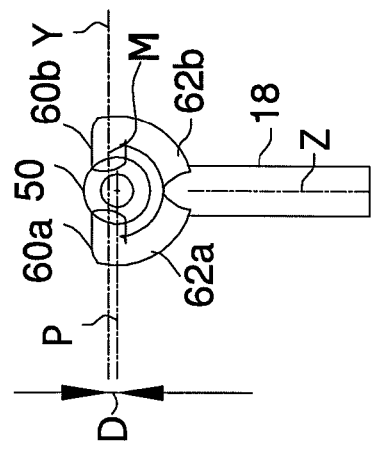
FIG. 6 shows a three-dimensional reconstruction of the channels in the valve pin bushing in FIG. 5 as seen from above.

FIGS. 6 to 8 show the three-dimensional development of the path that the molten material runs thanks to the above-described channels for the valve pin bushing 20b is. It is to be noted in particular the arrangement of the inputs 60a, b with respect to the channel 50.

Considered an imaginary plane P passing through the axis X and perpendicular to the axis Z, the inputs 60a, b have geometrical axes Y spaced apart by a distance D relative to the plane P. The offset D can be e.g. few millimeters, and allows to balance the prevalence of the flow induced by the lateral position of the entrance 64 and the dynamic behavior of the molten material when from the grooves 62a and 62b it flows into the inputs 60a and 60b respectively. Preferably, therefore, the offset D is obtained by setting the axis or axes Y apart from the entrance 64 with respect to the plane P, i.e. by moving the axis or axes Y in opposite direction with respect to the entrance 64. Note from FIG. 6 that for both input channels 60a, 60b the portion M of the geometrical axes Y which extends inside the same channels 60a, 60b belongs to one same semispace identified by the plane P (or, in other words, with respect to the plane P all the axes Y stay completely, or for their part contained in the channels 60a, 60b, on the same side of the plane P).

In use the molten material comes along the axis Z up to the entrance 64 and divides into two streams along the grooves 62a, b (which form closed channels because they are closed by the elements surrounding the valve pin bushing, in particular the manifold 12). Then it enters into the channels 60a, b and flows into the channel 50 with a direction indicated by the axis Y, in particular offset with respect to the plane P. Namely, the axis Y does not lie in the plane P but remains external to it, in particular at a distance D from it.

The center of the front of the material therefore is not directed towards the axis X, and this asymmetry allows to avoid low-velocity zones.

Fluid-dynamics simulations and laboratory tests show that the symmetry of filling of the molding cavity (downstream the valve pin bushing) increases, and hence the quality of the molded piece improves.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A valve pin bushing for a hot runner of an injection mold, comprising:
an output channel extending along a longitudinal axis up to an exit from which material to be injected can exit the valve pin bushing;

two input channels, each having a geometric axis and an outlet through which material to be injected can enter the output channel, each said geometric axis having a portion which extends at a corresponding outlet; and wherein the portions of the geometric axes are arranged so that on any imaginary plane passing through said longitudinal axis there lies at most one of said portions.

2. The valve pin bushing according to claim 1, wherein for both the input channels said portions of the geometric axes are arranged so as to belong to the same semispace delimited by an imaginary plane passing through said longitudinal axis.

3. The valve pin bushing according to claim 1, wherein at least one of said portions of the geometric axes is inclined with respect to a second imaginary plane orthogonal to said any imaginary plane.

4. The valve pin bushing according to claim 1, wherein said portions of the geometric axes are parallel to each other.

5. The valve pin bushing according to claim 2, wherein said portions of the geometric axes are inclined with respect to said imaginary plane.

6. The valve pin bushing according to claim 1, wherein one or each input channel is joined up to a groove, which extends on the outer surface of the valve pin bushing.

7. The valve pin bushing according to claim 6, wherein each input channel is joined up to a groove and the two grooves converge towards a common area to form a material-receiving zone.

8. The valve pin bushing according to claim 7, wherein the valve pin bushing is housed in a manifold member having a supply channel for molten material with a first cross-section, each of the two grooves has a second cross-section, and the second cross-section of each groove is less than the first cross-section of the supply channel.

9. The valve pin bushing according to claim 7, wherein the valve pin bushing is housed in a manifold member having a supply channel for molten material, and the material-receiving zone is adapted to geometrically fit with the supply channel.

10. A method for conveying molten molding material into a valve pin bushing belonging to a hot runner of a mold, the valve pin bushing comprising an output channel, which extends along a longitudinal axis up to an exit from which the material can exit the valve pin bushing, said method comprising the steps of:

feeding the material into the output channel through two input channels, which have a geometric axis and an outlet into the output channel, each the geometric axes having a portion extending at a corresponding outlet; and arranging said portions so that on any imaginary plane passing through said longitudinal axis there lies at most one of said portions.

11. The method according to claim 10, wherein at least one of said portions of the geometric axes is inclined with respect to a second imaginary plane orthogonal to said any imaginary plane.

12. The method according to claim 10, wherein said portions are parallel to each other.

13. The method according to claim 11, wherein said portions are inclined with respect to said any imaginary plane.

14. The method according to claim 10, wherein one or each input channel is joined up to a groove, which extends on the outer surface of the valve pin bushing.

15. The method according to claim 10, wherein each input channel is joined up to a groove which extends on the outer surface of the valve pin bushing, and the grooves converge towards a common area to form a material-receiving zone.

* * * * *